Aug. 27, 1963

G. K. REEN ETAL 3,102,250

VIBRATION PICKUP

Filed July 29, 1959

*Inventors*
*Gerald K. Reen*
*Thomas C. Warner, Jr.*
By their attorneys

*Howson and Howson*

Aug. 27, 1963    G. K. REEN ETAL    3,102,250
VIBRATION PICKUP
Filed July 29, 1959    2 Sheets-Sheet 2
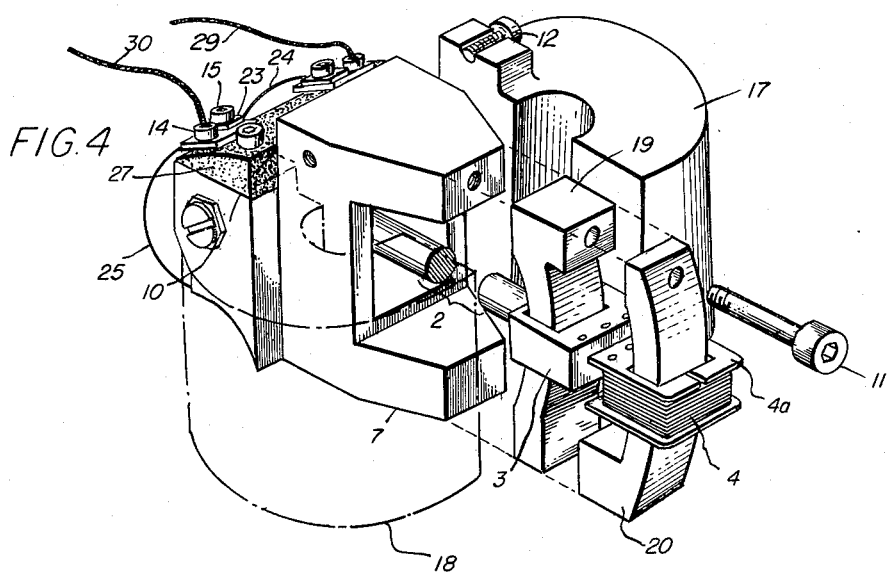
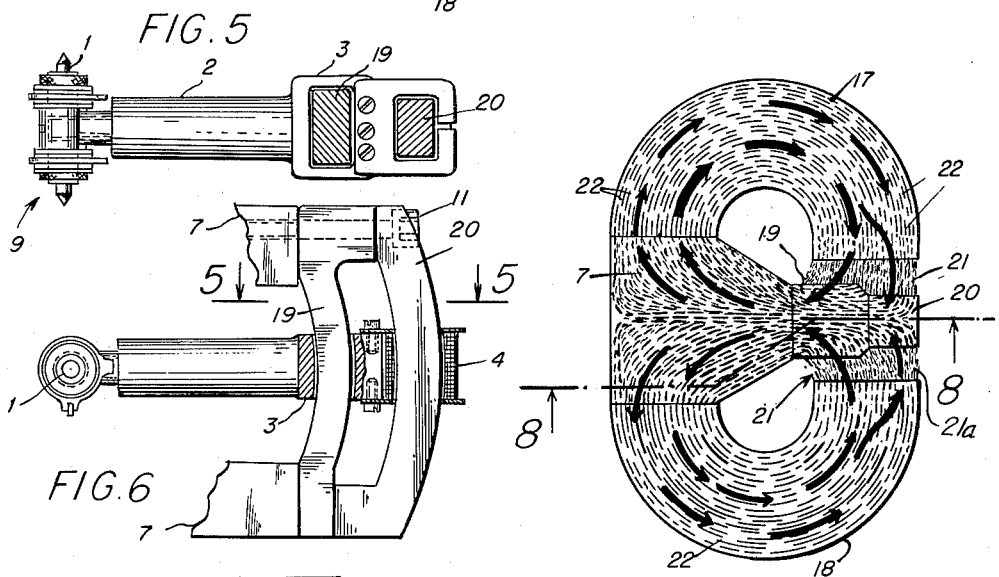
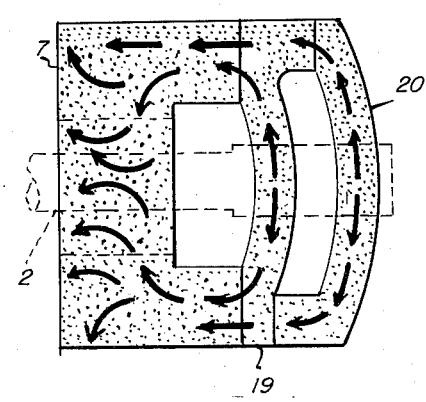
Inventors
Gerald K. Reen
Thomas C. Warner, Jr.
By their attorneys
Howson and Howson 3,102,250
Patented Aug. 27, 1963

3,102,250
VIBRATION PICKUP
Gerald K. Reen, Orange, and Thomas C. Warner, Jr., West Haven, Conn., assignors to Textron Electronics, Inc., Providence, R.I., a corporation of Delaware
Filed July 29, 1959, Ser. No. 830,223
5 Claims. (Cl. 340—17)

This invention relates to a vibration pickup instrument and more particularly to a miniature pickup of the seismic type. Such seismic instruments transform mechanical vibrations into electrical voltages which are proportional to the velocity of the mechanical vibration. In seismic systems there are no fixed points of reference. A pickup of this type has a coil of electrical conductors and a magnet structure, the two being movable with relation to each other. In most cases the magnet structure is attached to the specimen to which the pickup is attached and moves with that specimen. The coil is suspended in the magnetic field and for all practical purposes is "fixed" relative to space if the magnet structure is forced to move at a frequency somewhat higher than the natural frequency of the coil suspension. The relative velocity between coil and magnet structure results in the generation of a voltage proportional to this velocity.

The object of the present invention is to produce a pickup with an improved magnetic design and improved frequency response. Specifically, the objects are to obtain a pickup of light weight, miniature size, with reduced effect of external fields, D.C. or A.C., on coil sensitivity, adequate electrical damping for a suspension frequency of 20 cycles per second, and elimination of the "drooping" sensitivity seen when plotted against frequency which has been characteristic of pickups of this general type in the prior art.

This invention will provide a voltage in an amount greater than heretofore obtainable relative to the size of the instrument and compatible to other desirable design features. The invention also provides an instrument which can be varied to provide the desirable combination of high amounts of damping and "flat" frequency response to higher frequencies than heretofore obtainable in any instrument of the seismic type. Furthermore, the invention allows for considerable variation in the natural frequency of the pickup by changing the parameters of the springs or the signal winding while still maintaining a high degree of damping and flatness of frequency response. It has an integral mounting of bearings and pole pieces on one unit which allows wide frequency and temperature operation without significant change in performance. It also embodies a connector which provides a signal connection meeting the requirements of a vibration instrument in a smaller size than heretofore obtainable. The invention is capable of being used in any case where measurement of mechanical vibration is desired whether the motion is absolute or relative and will provide a simple and accurate means of measuring vibratory motion over a wide frequency range such, for example, as 5 to 3,000 cycles per second. This is done while employing the same low impedance and high sensitivity characteristic of other velocity type vibration instruments. Furthermore, direct reading of the voltage on standard vacuum tube voltmeters will give a direct measurement of velocity of vibration without the necessity of compensation for frequency effects or loading effects.

Referring to the drawings,

FIG. 4 is a perspective view, partly disassembled, of the bracket, the pole pieces, one of the magnets and the moving arm structure of the instrument of FIG. 1.

FIG. 5 is an assembled view in plan of the moving arm of FIGS. 1, 2 and 4, taken on the line 5—5 of FIG. 6.

FIG. 6 is a view in elevation of the arm of FIG. 5 threaded on the inner and outer pole pieces, the arm being shown partly in section.

FIG. 7 is a diagrammatic plan view of the path of the magnetic flux in the pickup shown in the drawings.

FIG. 8 is a diagrammatic view in elevation of the path of the magnetic flux through the center of the bracket and pole pieces on the line 8—8 of FIG. 7.

Figure 1:
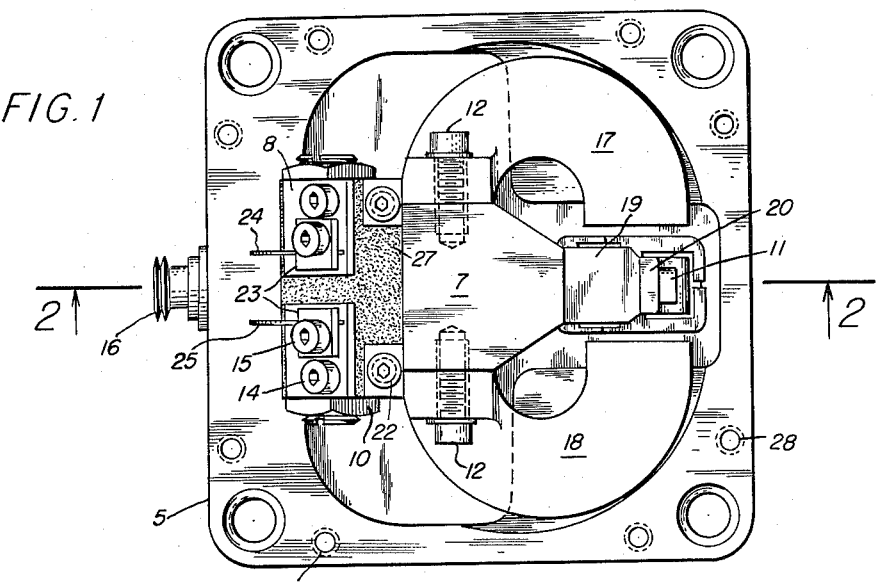
FIG. 1 is a plan view of a vibration pickup made in accordance with the invention with the cover removed.

One of the problems in the present invention was how to make a pickup of miniature size which would have a high flux density. A high flux density is necessary for a variety of reasons but we mention it at this point merely because it is necessary in order to obtain adequate electrical damping at a coil suspension frequency of 20 cycles per second. If we define the natural frequency of suspension at which critical damping will occur as $W_n$, B as the flux density in the air gap, $\rho$ as the resistivity of the material of the damping turn and $d$ as the density of the material of the shorted turn, then it can be shown that where all of the seismically mounted mass forms a conducting loop in the air gap we will have a critically damped frequency of $$W_n \approx \frac{B^2}{\rho d}$$

Because as a practical matter not all of the mass can be made active in damping, the frequency may be slightly lower than above indicated. We prefer to increase the natural frequency of the suspension, which is the point at which critical damping will occur, by increasing the flux density. In our construction of pickup the arrangement of the permanent magnets allows the achievement of a high air gap flux density with considerably less weight than any prior art designs. It is characteristic of our pickup that the relative motion between the pole pieces and the electrical signal coil is obtained by mounting the electrical signal coil in a magnetic field produced by a magnetic circuit and that we have support means in the form of a bracket for the seismic suspension and two curved permanent magnets carried on opposite sides of the support means, each having a free end which is parallel to and faces the free end of the other. Between the free ends of these magnets we have two pole pieces arranged so that each is equidistant from and in direct juxtaposition to the free ends of the magnets, thereby forming air gaps in the magnetic circuit. The seismic suspension is a moving arm assembly pivoted on the bracket and carrying the signal coil at the end of the arm assembly nearest the pole pieces.

As already explained, the preferred embodiment of the invention shown in the drawings has in one integral unit a mounting for the main parts of the pickup which have movement with respect to each other. Thus the support means or bracket 7 provides a mounting for both the moving arm assembly and the pole pieces of the magnetic circuit. The bracket 7 is mounted on a non-magnetic instrument base plate 5 by screws 6 (see FIG. 2). The tube or arm 2 of the moving arm assembly has pivots 1 thereon by which it is pivotally mounted in the bracket 7 (see FIGS. 2, 5 and 6). The electrical signal coil 4 is carried on the moving end of the arm 2 and consists of a multiplicity of turns of very fine magnet wire on a bobbin 4a (see FIG. 4). This bobbin may be made of a non-conductive non-magnetic material, or may be split to prevent the development of undesirable circulating currents which might otherwise be present. The bobbin is screwed or otherwise fastened to a single copper damping turn 3 which is carried on the arm 2 between the signal winding coil and the pivot 1 of the arm. The damping turn 3 is shown as an integral part of the arm 2 (see FIG. 2). The damping turn may be of copper or other highly conductive, non-magnetic material.

The above described moving arm assembly, including the damping turn 3 and signal coil 4, are supported on a bearing screw assembly 9 attached to and forming part of the bracket 7. The assembly 9 is locked in correct position by lock nuts 10.

The magnetic circuit in addition to the bracket 7 includes two permanent magnets 17, 18 attached to opposite sides of the bracket 7 by screws 12 (see FIGS. 1 and 4). These magnets as stated before are curved with their free ends facing toward each other as shown in FIGS. 1, 4 and 7.

Attached to the end of the bracket 7 opposite and in direct juxtaposition to the free ends of the magnets 17, 18 are two pole pieces 19, 20. They are attached by a screw 11 holding pole piece 19 against the bracket 7 and pole piece 20 against pole piece 19 thereby forming two air gaps, one air gap 21 between the two pole pieces and the free end of magnet 17, and the other air gap 21a between the two pole pieces and the free end of magnet 18. The damping turn 3 is threaded on the inner pole piece 19 and the signal coil 4 and bobbin 4a are threaded on the outer pole piece 20. These are shown in exploded position in FIG. 4 but in their proper position in FIGS. 2, 5 and 6. These pole pieces are in the magnetic circuit. The outer pole piece 20 provides a return path for the magnetic flux passing through the signal coil 4 and the inner pole piece 19 provides a return path for the magnetic flux passing through the damping turn 3. As already explained, the damping turn provides a mounting or connecting link for the signal coil to the bracket 7. The flux in the air gaps 21, 21a (see FIG. 7) forms the field in which the signal coil 4 is suspended. Thus each pole piece is directly juxtaposed to both magnets 17, 18.

Figure 2:
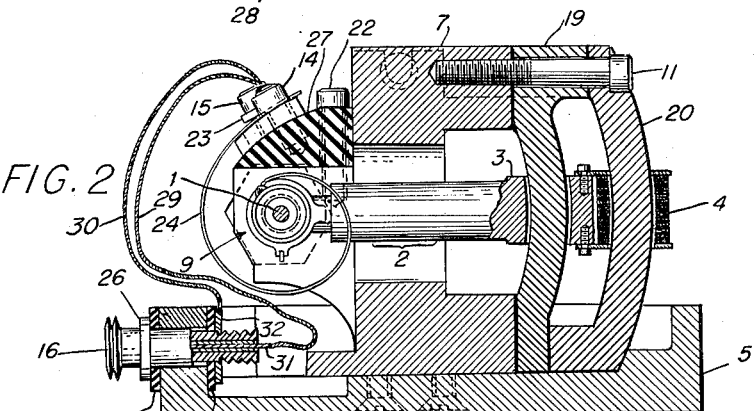
FIG. 2 is a vertical view in section through the middle of the instrument of FIG. 1 parallel to the moving arm taken on the line 2—2 of FIG. 1.
Figure 3:
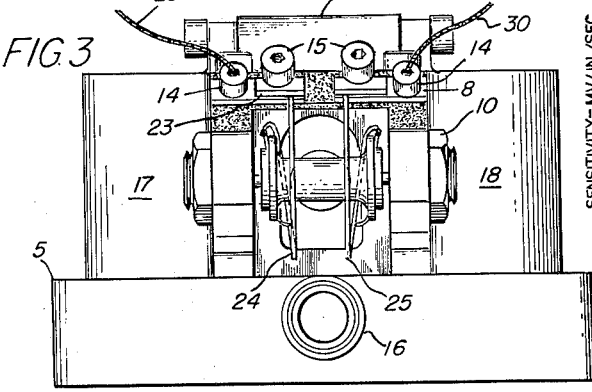
FIG. 3 is a view in end elevation of the instrument shown in FIG. 1 viewing same from the end at which the moving arm is pivoted.

The outer end of each spring 24, 25 is fixed on an insulating upper part 27 of the bracket 7 by a screw type regulator 8. Each regulator has a small plate attached to the bracket by a screw 14. The part of the bracket in which the screw is fastened is united to the main part of the bracket 7 by vertical screws 22. Through each small plate is a screw 15 and regulator nut 23 which clamps the outer end of one of the hair springs 24, 25 to the regulator nut 23. The electrical circuit is connected to the hair spring by means of wires 29 coming to the screw for regulator 8. After coiling around the pivot shaft 1, the inner ends are fastened to the moving arm assembly as shown in FIGS. 2 and 3 so that the tension of the springs determines the position of the moving arm 2 carrying the damping turn 3 and the signal coil 4. The tension of the springs can be regulated by the nuts 23 as desired. This changes the parameter of the springs. By this construction the natural frequency of the pickup can be changed while still maintaining a high degree of damping and flatness of frequency response.

The base plate 5 may have attached to it an enclosing cover (not shown) which is attached to the base plate by means of screws taking into holes 28 in the periphery of the base (see FIG. 1).

The electrical voltage signal developed is brought out on the wires 29, 30 of the instrument through a special connector 16 shown in detail in FIG. 2 of the drawings. This connector is insulated from the base itself by means of insulating spacers 13 and an anodized insulating coating 26 on part of the outside of the connector as illustrated by heavy lines in FIG. 2. The coil 4 is electrically connected to the springs 24, 25 by wires (not shown) inside the tube 2. The springs themselves act as conductors and from the ends of the springs at the screws 15 the plates 8 and the screws 14 provide electrical connection to the electrical wires 29, 30. The lead wire 29 coming off the top of the pickup at a screw 14 is connected to the center pin 31 of the connector 16, while the lead wire 30 coming from the other side of the top of the pickup is connected to the shell of the connector (see FIG. 2). As shown in this FIG. 2 the anodized coating does not extend inwardly toward the base beyond the insulating washer 13 and the wire 29 therefore is connected electrically with the body of the connector by means of a clip 32 just inwardly of the washer 13. The anodized coating is incorporated in the metal itself and therefore it does not add to the dimension of the connector. If desired the anodized coating can be combined with an epoxy coating. With this arrangement the connector need be only large enough to take one wire and with the interior passage of the connector also anodized a connector is produced whose dimensions are small enough to permit a miniature connector to go with the much reduced size of the rest of the device.

The above described arrangement produces circulating currents (eddy currents) in the damping coil 3 which provides damping. In addition the arrangement of the permanent magnets in the new design allows the achievement of a high air gap flux density with considerable less weight than in prior art designs. This is due primarily to the fact that the major portion of the magnetic path is permanent magnet material. The greater efficiency of the design also reduces the effects of external magnetic fields.

Figure 9:
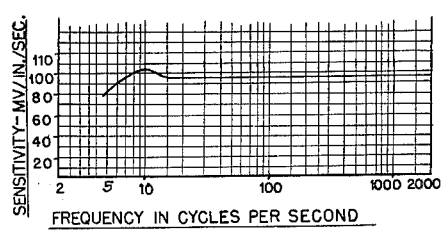
FIG. 9 is a typical example of a graph of the frequency response characteristics of the pickup shown in the drawings, the frequency being plotted against the sensitivity in millivolts per inch per second.

It has been found that a flat response can be obtained with natural frequencies up to 20 c.p.s. over a range exceeding 2,000 c.p.s. It has been found satisfactory for accelerations up to 50 g for continuous duty. The sensitivity of the machine is not affected by temperatures between minus 85° F. and plus 500° F. It will also be noted that the machine with a high suspension frequency may be mounted in any position. The sensitivity of the embodiment used for the graph of FIG. 9 is 96.3 mv./in./sec. The pickup is selfgenerating and no cathode follower or other impedance matching amplifier is required.

Further with regard to the matter of the drooping sensitivity characteristic of prior art instruments, it has been found that this was due to currents flowing in the damping winding. These, at high frequencies, were transformer coupled to the signal coil due to the proximity of the two coils sharing the same magnetic path. This coupling was such that the useful signal voltage output was reduced by the electrical coupling from the damping winding. By separating the damping and signal coils, this coupling is reduced. We have found it possible to do this by allowing for the provision of separate coils and yet having a single magnet circuit which reduces the size and weight of the instrument. This allows achievement of a signal sensitivity which is independent of frequency over a broader range than found in the prior art. In addition, our arrangement is unique in that any electrical coupling which does exist at high frequencies is that the useful signal output is increased rather than reduced. If necessary, the increase can be corrected with passive elements without sacrificing the high level output at the lower frequencies. Thus it will be observed that a very small instrument with improved performance characteristics has been produced. In this aspect of the invention it might be noted that the connector 16 provides a signal connection meeting the requirements of a vibration instrument in a smaller size than heretofore obtainable.

What is claimed is:

1. A vibration pickup of the seismic velocity type having a seismic suspension comprising a moving arm assembly, support means on which the assembly is pivoted, and two permanent magnets, each having a free end which faces the free end of the other magnet, which magnets are carried on opposite sides of the support means in combination with two pole pieces, each being arranged in direct juxtaposition to the free ends of the magnets without the intervention of the other pole piece thereby forming two air gaps, one being between the two pole pieces and the free end of one magnet, and the other between the two pole pieces and the free end of the other magnet, these parts forming a magnetic circuit with each pole piece providing a separate magnetic flux path in that circuit, an electrical signal coil on said moving arm assembly surrounding one of the pole pieces and a damping coil also on the said moving arm assembly but surrounding the other pole piece.

2. A vibration pickup of the seismic type according to claim 1 in which the signal coil has a multiplicity of turns extending around one of the pole pieces, and the damping coil is of a single turn of highly conductive, non-magnetic material on the arm of the assembly; the two pole pieces providing separate return paths in the one magnetic circuit for the flux from the two coils.

3. A vibration pickup of the seismic velocity type in which there is an electrical signal coil, a seismic suspension therefor comprising a moving arm assembly, support means for the seismic suspension on which the assembly is pivoted, a magnetic circuit containing a field in which the electrical signal coil is suspended, and two permanent magnets carried on opposite sides of the support means, the free ends of which magnets face each other, in combination with two pole pieces between the free ends of the magnets, said pole pieces being so arranged that each pole piece is in direct juxtaposition to the free ends of both magnets thereby forming two air gaps, one being between the two pole pieces and the free end of one of the magnets, and the other between the two pole pieces and the free end of the other magnet, and a damping coil made of a single turn of non-magnetic material, said signal coil and damping coil being carried in fixed relation to each other on the moving arm assembly, the signal coil extending around one of the pole pieces and the damping coil around the other; whereby any electrical coupling between the two coils at high frequencies increases the useful signal output.

4. A vibration pickup of the seismic type according to claim 1 in which the support means provides a mounting for the moving arm assembly, the pole pieces, and the permanent magnets in one integral unit; whereby wide frequency and temperature changes can occur without significant change in performance.

5. A vibration pickup of the seismic type having a seismically suspended electrical coil in combination with a permanent magnetic circuit, said circuit including two permanent magnets each having a free end which faces the free end of the other magnet, and a bracket supporting same, a pivoted arm assembly member on which there is an electrical signal coil, which said arm assembly member is also supported by the bracket, two pole pieces spaced apart in the direction of the length of the said arm assembly and so arranged between the free ends of the permanent magnets that each pole piece is directly juxtaposed to both magnets without the intervention of the other pole piece, thereby forming two air gaps in the magnetic circuit, one being between the two pole pieces and the free end of one of the magnets and the other between the two pole pieces and the free end of the other magnet, and a damping coil on the said arm assembly around one pole piece and the signal coil around the other; whereby while there is essentially one magnetic circuit the damping coil and the signal coil have separate circuits and a high degree of damping and flatness of frequency response is obtained at high frequencies.

References Cited in the file of this patent

UNITED STATES PATENTS

| | | |
|---|---|---|
| 2,130,213 | Wolf | Sept. 13, 1938 |
| 2,286,386 | Silverman | June 16, 1942 |
| 2,418,953 | Raitt | Apr. 15, 1947 |
| 2,443,969 | Tyler et al. | June 22, 1948 |
| 2,657,374 | Bardeen | Oct. 27, 1953 |
| 2,659,065 | Cordell | Nov. 10, 1953 |
| 2,683,867 | Vann | July 13, 1954 |
| 2,920,308 | Williams | Jan. 5, 1960 |